United States Patent
Estrada et al.

(10) Patent No.: US 7,213,010 B2
(45) Date of Patent: *May 1, 2007

(54) SYSTEM AND METHOD FOR THE AGGREGATION OF PLACE INFORMATION IN A MULTI-SERVER SYSTEM

(75) Inventors: Miguel A. Estrada, Hollis, NH (US); Sami M Shalabi, Arlington, MA (US); Mustansir Banatwala, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 10/334,269

(22) Filed: Dec. 31, 2002

(65) Prior Publication Data

US 2004/0139109 A1    Jul. 15, 2004

(51) Int. Cl.
*G06F 17/31* (2006.01)
*G06F 15/173* (2006.01)

(52) U.S. Cl. .................. 707/1; 707/102; 707/104.1; 709/223

(58) Field of Classification Search .................. None
See application file for complete search history.

(56) References Cited

U.S. PATENT DOCUMENTS

| | | | |
|---|---|---|---|
| 6,904,439 B2* | 6/2005 | Tang et al. | 707/102 |
| 2002/0092004 A1* | 7/2002 | Lee et al. | 717/140 |
| 2002/0095436 A1* | 7/2002 | Lee | 707/203 |
| 2005/0131800 A1* | 6/2005 | Parks et al. | 705/37 |

* cited by examiner

*Primary Examiner*—Jeffrey Gaffin
*Assistant Examiner*—Hassan "Tony" Mahmoudi

(57) ABSTRACT

A system for aggregating data descriptive of a plurality of projects and servers includes a host catalog; a host catalog server; a plurality of project servers; a plurality of project databases; a cluster including a master server and a plurality of project servers; a project database associated with each project server; an entry in the host catalog for each project server and each project database. The place catalog server executes simple aggregation on behalf of a project server which is a master non-virtual server selectively by immediate updating and scheduled updating of an entry in the host catalog for the project server; and executes complex aggregation on behalf of a cluster of servers by executing immediate updates to a master entry in the host catalog database and by executing non-immediate updates to an entry in the host catalog database for a non-virtual, non-master project server.

15 Claims, 6 Drawing Sheets

| PLACE NAME (323) | SERVER (329) | MASTER (327) | VIRTUAL (325) | MGR (346) | RDR (347) | AUTHOR (348) | SIZE (349) | LOCK (350) | TITLE (351) |
|---|---|---|---|---|---|---|---|---|---|
| Z | LB1 | 1 | 1 | JOE JANE | JACK MIKE | SAM1 | ↑15↑ | 0 | THE 2 PLACE |
| Z | B | 0 | 0 | ↓ | ↓ | | 10 | | ↓ |
| Z | C | 0 | 0 | ↓ | ↓ | | 15 | | ↓ |

0 = NOT SET
1 = SET
↓ = MERGE

PLACES BY MEMBER VIEW (PARTIAL)

FIG. 7

SYSTEM AND METHOD FOR THE AGGREGATION OF PLACE INFORMATION IN A MULTI-SERVER SYSTEM

COPENDING U.S. PATENT APPLICATIONS

Ser. No. 10/334,261, filed 31 Dec. 2002, now U.S. Pat. No. 6,904,439, issued 5 Sep. 2005, entitled "SYSTEM AND METHOD FOR AGGREGATING USER PROJECT INFORMATION IN A MULTI-SERVER SYSTEM";

Ser. No. 10/334,296, filed 31 Dec. 2002, entitled "SYSTEM AND METHOD FOR CENTRAL REFRESH OF PLACE OBJECTS"; and Ser. No. 10/454,301, filed 4 Jun. 2003, now U.S. Pat. No. 7,089,231, issued 8 Aug. 2006, entitled "SYSTEM AND METHOD FOR SEARCHING A PLURALITY OF DATABASES DISTRIBUTED ACROSS A MULTI SERVER DOMAIN";

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to a system and method for aggregating information descriptive of servers and projects in a multi-server environment.

2. Background Art

In computer systems, users typically have access to several or many different sites, such as URLs, applications and databases. In such systems, a user may have difficulty remembering and tracking all of these applications and databases. One approach to facilitating such is through the use of a "favorites" facility, which allows a user to add to a drop down list an entry identifying such sites. Another approach is to provide access to a database which stores project and membership information on a local system.

Such approaches have been limited to listing places, projects and databases on a single server or individual machine, and have not accounted for multi server deployments, nor for groups of servers configured in a cluster and addressed as one server.

SUMMARY OF THE INVENTION

A system and method for aggregating data descriptive of a plurality of projects and servers by configuring a catalog database server to a host catalog database and as accessible to a plurality of project servers; configuring each server for accessing the catalog database server; providing for each project server and each project a separate entry in the host catalog database including catalog database indicia describing each project server and project indicia describing each project; the project server indicia including project server is master indicia and project server is virtual indicia; executing simple aggregation by operating a project server which is a master server to access the catalog server selectively for immediate update and scheduled update of the catalog; and executing complex aggregation by operating a project server in a cluster of servers to access the catalog server selectively to send immediate updates to a master entry in the host catalog database for a master server in the cluster and non-immediate updates to an entry in the host catalog database for the project server.

In accordance with an aspect of the invention, there is provided a computer program product configured to be operable to execute simple and complex aggregation of data descriptive of a plurality of projects and servers and server clusters.

Other features and advantages of this invention will become apparent from the following detailed description of the presently preferred embodiment of the invention, taken in conjunction with the accompanying drawings.

BRIEF DESCRIPTION OF THE DRAWINGS

FIG. 7 is a diagrammatic representation of the places by member view of FIG. 4 showing synchronization of clustered servers with a virtual master server.

BEST MODE FOR CARRYING OUT THE INVENTION

Figure 1:
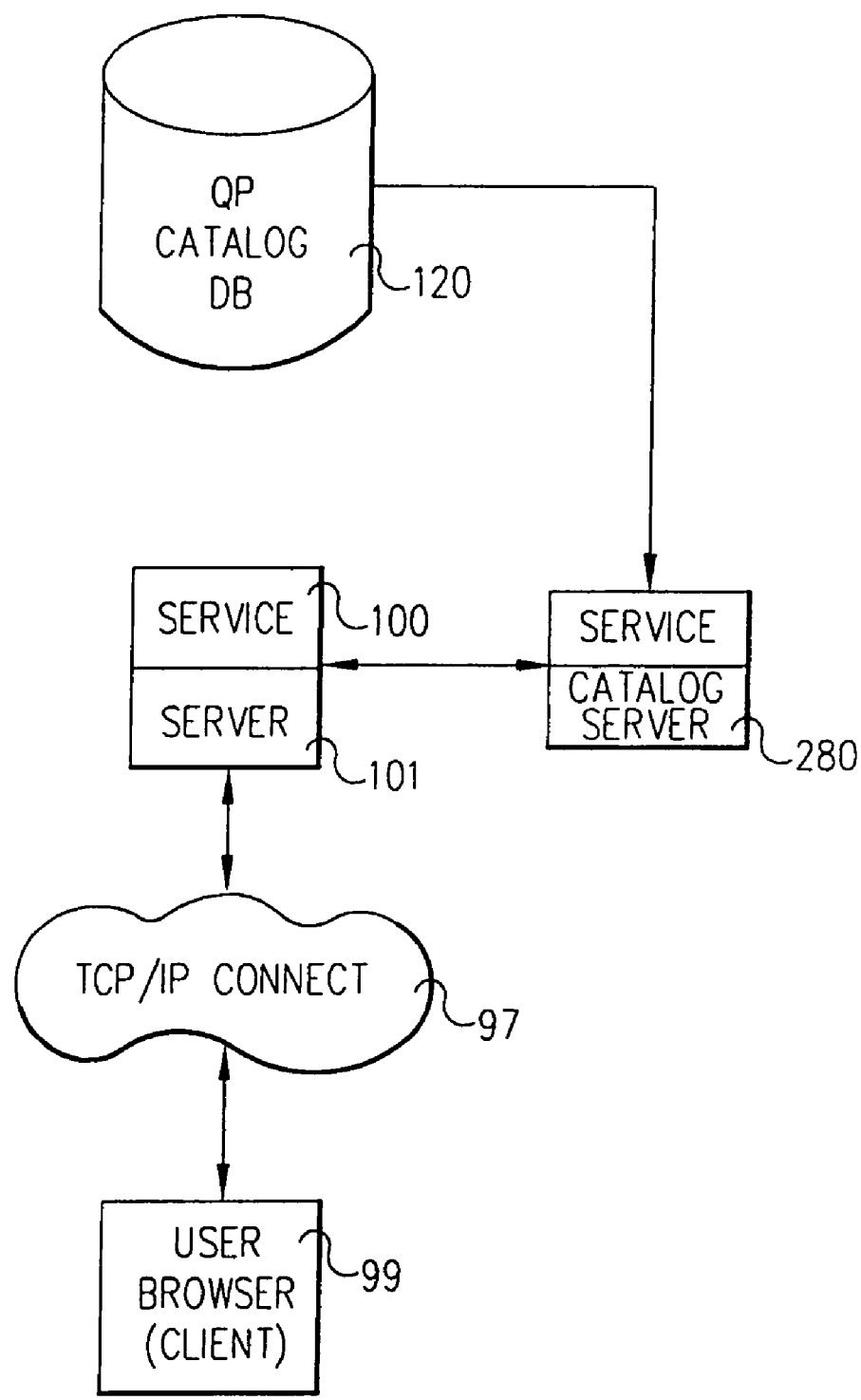
FIG. 1 is a high level system diagram illustrating a typical system configuration in accordance with the preferred embodiment of the invention.
Figure 2:
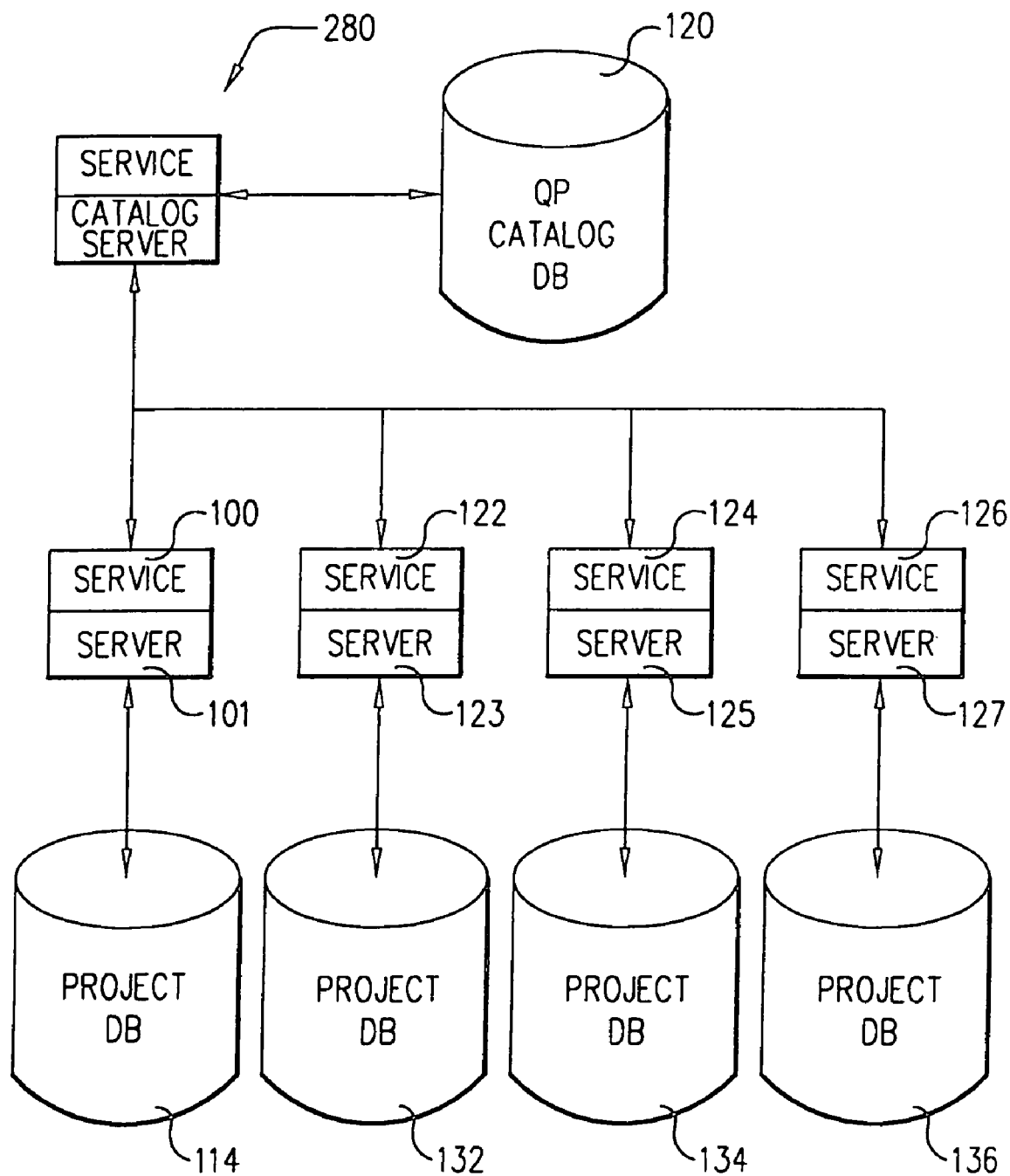
FIG. 2 is a high level system diagram illustrating a typical multi-server system environment.

Referring to FIGS. 1, 2 catalog 120 is a database, such as a QuickPlace catalog, for aggregating information about projects, such as QuickPlaces 114, 132, 134, 136, in a multi-server system environment, including service 100/server 101, 122/123, 124/125, and 126/127, communications link 97, and one or more client terminals, such as user browsers 99. Throughout this specification, the generic term "project" and more specific terms "place" or "QuickPlace" are used substantially interchangeably. Place and QuickPlace are specific examples of projects. Similarly, "host catalog" and "QuickPlace catalog" are equivalent terms.

In accordance with the preferred embodiments of the data structures of the invention, places exist on multiple servers and server clusters.

The functionality available to each user via remote terminals 99 may be customized in accordance with the needs and authorization of the user and/or entity. Terminals 99 may access the system using, for example, browser software technology or other electronic accessing methods as my be known to one of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, get aggregate view across all servers and projects. In a preferred embodiment, this service is implemented in an abstract sense, in that each server 100 implements a notion of service, which in this sense is a multi-server deployment of QuickPlace servers 101 that can be treated as a consistent unit of service for administration and in the user interface. A QuickPlace service 100 comprises multiple QuickPlace servers 101 and/or QuickPlace clusters, which: (1) share the same Domino certified; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 3:
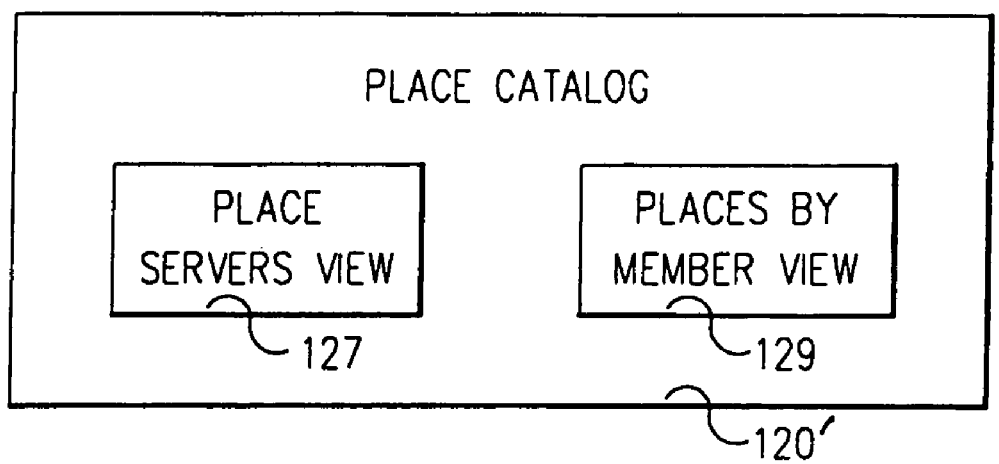
FIG. 3 is a diagram illustrating the host catalog of FIG. 1.

Referring to FIG. 3, host catalog 120 includes a place servers view 128 and a places by member view 129. Catalog 120 collects data about places and provides administrators with a central point of control across multiple QuickPlace application servers 101 and clusters. Administrators can generate reports from catalog 120 to set management policies. A My Places end-user feature also depends on catalog 120. The Host catalog has two audiences: administrators and users. Administrators can use a QPTool command line tool or an XML interface to the QuickPlace Java™ XML API to access the host catalog 120 to query information. Users access catalog indirectly, through features such as My Places, which allows them to see the places they belong to, and Search Places, which allows them to search in places across the enterprise. In an exemplary embodiment, catalog 120 is a centralized database in which to collect information about all a users QuickPlaces 114, 132 and QuickPlace servers 101, 123.

Figures 4, 5:
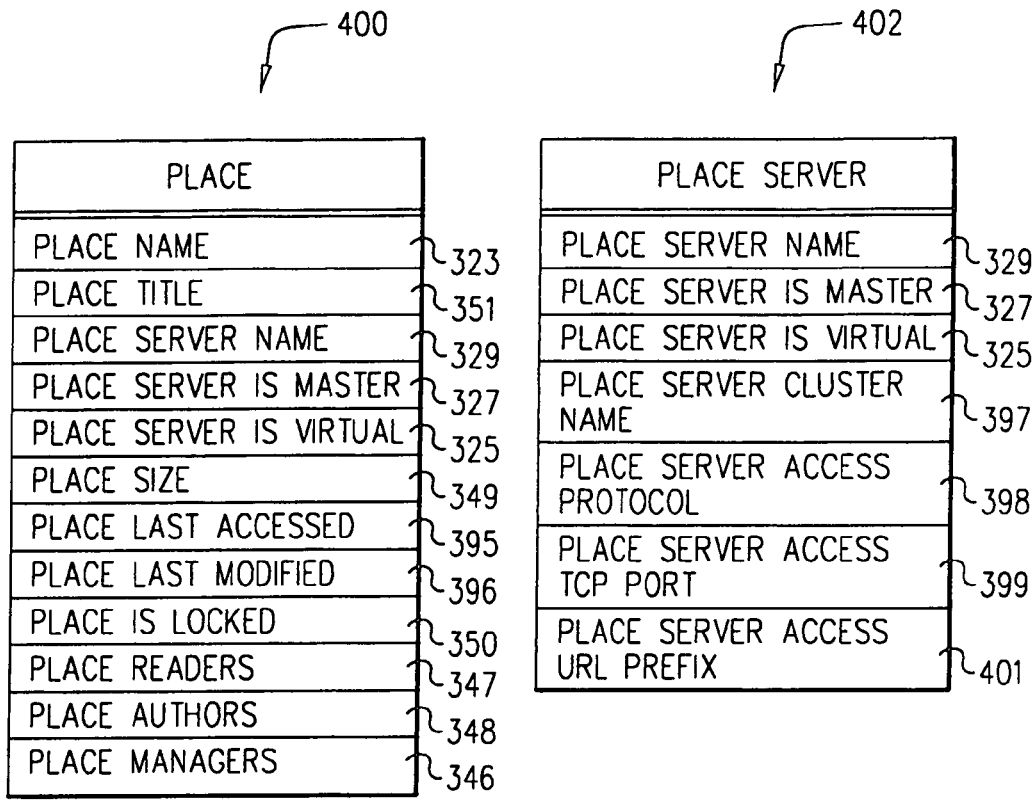
FIG. 4 is a diagrammatic illustration of the content of the places by member view of FIG. 3.
FIG. 5 is a diagrammatic illustration of the content of the place servers view of FIG. 3.

Referring to FIG. 4, information 400, 402 stored in host catalog 120 includes in place server view 127' for each QuickPlace server 101, 123, 125, 127 in the enterprise:
PlaceServerName 329,
PlaceServerAccessProtocol 298,
PlaceServerAccessTCPPort 399,
PlaceServerAccessURLPrefix 401,
PlaceServerIsMaster 327,
PlaceServerIsVirtual 325,
PlaceServerClusterName 397;

and in place by member view 129 for each place 114, 132, 134, 136 in the enterprise:
PlaceName 323,
PlaceTitle 351,
PlaceServerName 329,
PlaceManagers 346,
PlaceAuthors 348,
PlaceReaders 347,
PlaceSize 349,
PlaceLastAccessed 395,
PlaceLastModified 396,
PlaceIsLocked 350,
PlaceServerIsMaster 327, and
PlaceServerIsVirtual 325.

Host catalog 120 contains data on the QuickPlace servers 101 in a service 100, the places 114 that live on those servers, and the members of those places. Each server 101 and each place 114 in the service 100 has a separate entry in catalog 120. In an exemplary embodiment, a catalog entry is implemented as a database record, such as a Lotus Notes® note. The enterprise administrator may decide to have one catalog 120 for the enterprise or to have several catalogs servicing separate areas of the enterprise.

Host catalog database 120 may be created using a place catalog or Notes template (.ntf file).

Figure 6:
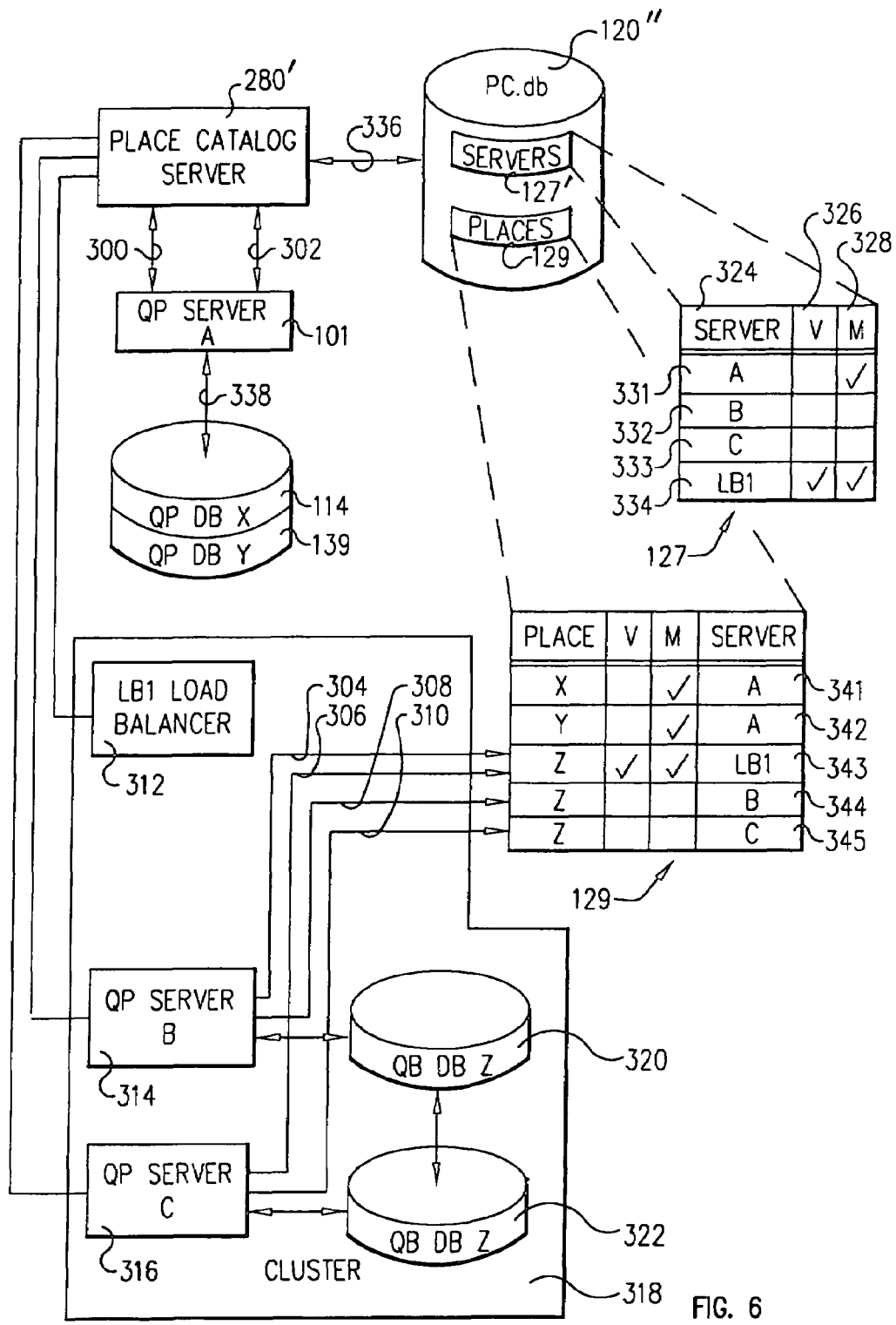
FIG. 6 is a system diagram illustrating dynamic and offline methods for aggregating information about servers and places in a multi-server environment which may include clusters.

Referring to FIG. 6, host catalog server 280' is a Domino server with QuickPlace installed which has been configured as is represented by line 336 to host catalog database 120 and which is accessible as is represented by lines 300, 302 to QuickPlace servers 101 in the enterprise through the Notes RPC (tcp port 1352) and http protocols. A typical project, or QuickPlace, cluster 318 includes a load balancer LBA server 312, a plurality of other servers 314, 136, and project databases 320, 322. A project cluster 318 is treated as a single virtual server in the service model.

Some entries 331–334, 341–345 are created or updated in the Host catalog 120 in real time—the moment an event happens. Other entries are created or updated manually by a server task, or on a scheduled basis.

As is represented by line 300, is essential that certain data be sent in real time to avoid conflicts. For example, in a QuickPlace service 100 there cannot be two places 114, 139 with the same name. The creation of a new place 139 is an event that creates a new Catalog entry in real time. When a user creates a new place, QuickPlace server 101 first checks the Catalog 120 for that name before creating a new entry. If it finds an existing place with that name, the user is prompted to choose a different name. If the creation of a place 139 did not immediately create an entry, it would be possible for two users to successfully create two places with the same name, which would cause a conflict when QuickPlace attempted to create entries for both in the catalog 120. For this reason, it is essential that a Host catalog server 280 a QuickPlace server 101 is configured to use remains available. To increase availability of host catalog 120, the Domino clustering feature can be used to make several host catalog servers available (not shown).

Data can be updated in catalog 120 using the QPTool placecatalog-push command or on a schedule on the QuickPlace server 101.

Host catalog 120 (designated in FIG. 6 as PC.db 120") contains information in servers view 127 about servers 324 and in places view 129 about places. Thus, in host catalog 120 (PC.db 120"), there is an entry 331 for server A 101. For simple case aggregation, or data update, projects 114, 139 are preconfigured as is represented by lines, 338, 300 to point to host or place catalog server 280' immediately when changes occur, or as is represented by lines 338, 302 at a particular time (say, each day at 2:00 a.m.) Immediate changes may thus be made when changes occur such as place create, place remove, place lock, change access (add/remove readers, authors, managers), and change title. Scheduled updates may be made, for example, for changes such as last modified, title, size, last accessed.

Complex aggregation is required when working with clusters.

Each entry in catalog 120, 120" has a virtual indicia entry 325, 326 and master indicia entry 328, 327. A master entry, such as entry 343, is the entry through which all access to the catalog occur for a given cluster of servers 312, 314, 316. In FIG. 6, servers A 101 and LB1 312 are master servers, and columns 327 and 328 are set for corresponding entries 331, 334, and 341–343.

A virtual server is a server that does not have project (aka, place) data, but knows how to connect place users to the project servers 314, 316 which do have place data 320, 322. Server LB1 312 is a virtual server because it does not have place data in a database. Project servers A 101, B 314, and C 316 are not virtual servers because they do have place data in databases X 114, Y 139, and Z 320, 322. Databases Z 320, 322 are clustered, so they are identical; a change to one is immediately replicated to the other.

Complex aggregation for clusters is done by sending immediate updates as are represented by lines 304 and 306 to master entries 334, 343. All other updates as are represented by lines 308 and 310 to the corresponding place entry 344, 345 for the respective servers B 314, C 316. For scheduled update, host catalog server 280 executes a process to merge entries from the virtual master LB1 312 (see entry 343, which as virtual field 235 and master field 327 set) to merge entries from the virtual master entry 343 to entries 344, 345 for other servers B 314, C 316, as is illustrated in FIG. 7.

Referring to FIG. 7 in connection with FIG. 6, in an enterprise with a QuickPlace server cluster 318, a QPTool placecatalog-update command can be run on the host catalog server 280 to synchronize data between a place's entries 344, 345 on each physical server 314, 316, and the place's virtual entry 343. For example, before QPTool placecatalog-update is run, the place's virtual entry 343 contains the membership information 346–348, but the place's physical server 314, 316 entries 344, 345 do not. After QPTool placecatalog-update, all entries 343–345 except size 349 contain the same field values. In the case of size 349, the virtual entry 343 contains the maximum size from the non-virtual entries 344, 345.

The Host catalog feature is enabled by the administrator creating a host catalog database 120 and a configuration file.

The Host catalog may be created by using a PlaceCatalog.ntf template to create a Notes database. The template should be found in the Domino data directory where Quick-Place was installed. Access control on the catalog 120 is granted only to all the QuickPlace servers 101, etc. and to administrators of the system.

The PlaceCatalog feature is configured for each server 101, etc. that interacts with the PlaceCatalog server 280 through a configuration file formatted as xml. That is, each QuickPlace server 101, etc. that wishes to operate with a PlaceCatalog 120 must have its own configuration file. The name of the file is qpconfig.xml, and is set forth in Table 1.

TABLE 1

| qpconfig.xml |
|---|
| 1  <?xml version="1.0" standalone="yes"?> |
| 2  <server_settings> |
| 3    <place_catalog_settings enabled="true"> |
| 4      <log_level>4</log_level> |
| 5      <domino_server_name>cat1/acme</domino_server_name> |
| 6      <nsf_filename>PlaceCatalog.nsf</nsf_filename> |
| 7    </place_catalog_settings> |
| 8    <cluster_settings> |
| 9      <master virtual="true"> |
| 10       <hostname>qp.acme.com</hostname> |
| 11     </master> |
| 12   </cluster_settings> |
| 13 </server_settings> |

Place_catalog_settings (Table 1, lines 3–7) contain settings related to the host catalog feature as it relates to the server associated with this configuration file. The following argument is available in this section:

enabled="true" (default)
enabled="false"

The administrator may disable and enable the PlaceCatalog operations for each QuickPlace server.

This Place_catalog_settings section (Table 1, lines 3–7) includes the following sections:

log_level which provides the administrator with the option of logging operations related to the Host catalog in the Domino server console;

domino_servername which contains the name of the server hosting the host catalog in Domino format: server/organization;

nsf_filename which is the name of the host catalog database 120 (ie PlaceCatalog.nsf).

Cluster_settings (Table 1, lines 8–12) contains settings related to the clustering feature as it relates to the server associated with this configuration file. The PlaceCatalog feature must understand the clustering configuration so it can make the proper decisions when registering places with the Host catalog. This cluster_settings section includes the following sections:

master

In QuickPlace clustering there is a concept of a "master" server 312. It specifies which server in the cluster 318 acts as the "entry point" to a QuickPlace 320, 322. It can be a QuickPlace server or it can be a network dispatcher which acts as a "virtual" server. The following argument is available in this section:

virtual="yes"
virtual="no" (default)

which specifies if the master server is a device other than a QuickPlace server such as a network dispatcher or local director 312. This section includes the following sections:

hostname which specifies the hostname in tcpip format of the master server 312 in a QuickPlace cluster 318 (ie. qp.acme.com). This would be the host name of a network dispatcher or local director (virtual must be "yes" above) or the hostname of a QuickPlace server (virtual must be "no" above)

A QuickPlace server 101 may already contain existing places, such as place 114, which were created prior to configuring host catalog 120 or which were added there from a different server. In this case, the host catalog 120 must be told of the existence of these other places. This is done by using a qptool utility function "register". By default, the register function will register the place with the server that hosts it and also with the PlaceCatalog if one is configured.

Since catalog 120 must uniquely identify a place by its name, no two different places can have the same name. This must be accommodated when upgrading an existing Quick-Place installation where two different places can have the same name on two different servers. In this case the administrator must first resolve the conflict by unregistering one of the places, renaming its directory and then registering the place with the new name.

Each time a place is created, it is registered in real-time with Host catalog server 200. This means that PlaceCatalog is configured on a QuickPlace server, then the Host catalog server must be operational for users to be able to create places.

Everytime a place is deleted, it is un-registered in real-time with host catalog server 280.

When a QuickPlace manager adds, removes or changes a member's access level, an update is done to the Host catalog 120.

Host catalog 120 may be queried to retrieve a list of places in which a user, or one of the groups of which the user is a member, is a member.

When a user performs a search scoped to a number of QuickPlaces on one or more servers, the system uses a search domain server to perform the search and it also uses the Host catalog server to properly construct the URLs to the places found in the search request. For this reason, the search domain server must be configured to recognize the Host catalog server 280.

Last accessed 395 updates may be made in real time (every 1 minute) to the Host catalog 120.

Certain information maintained in host catalog 120 may not updated in real-time. Examples include place size 349 and the last time it was accessed 395 or modified 396. This information must be updated in batch mode. This is accomplished by running a qptool utility function "placecatalog-push" on, for example, a daily basis. This can be automated as a Domino program entry similar to the QuickPlace-Nightly tool.

When using QuickPlace clusters 318, the host catalog 120 data is maintained for each node 312, 314, 316 in the cluster as well as for a virtual place representing the combination of all nodes if and only if a network dispatcher or local director has been configured and the proper settings reflect it in the qpconfig.xml configuration file. In this case, real-time updates to the catalog are done to the virtual place entry 343 and the non-real time updates are done to each of the cluster node entries 344, 345. This allows the administrator flexibility in knowing differences in access and size for each of the nodes in the cluster.

The last accessed time 395 updates may present a problem in large installations. For this reason, a replica of the Host catalog 120 may be created for each QuickPlace server. This replica should use a replication formula so that only those entries that match the QuickPlace server are replicated. This saves space and time as each QuickPlace server will have a copy with only the entries for places that it contains. In this case, the lastaccessed updates occur on the local replica of the PlaceCatalog and the Domino replication schedule dictates when they are made to the central Host catalog 120.

There are two QuickPlace server cluster environment alternatives for storing QuickPlace server cluster data in Host catalog 120.

1. If the cluster 318 does not have a virtual server 312, data is maintained in separate entries in the Host catalog 120 for each physical server 314, 316, and for each place 320, 322 on a physical server.
2. If the cluster 318 has a virtual server 312, each physical server 314, 316 and place 320, 322 has an entry 344, 345, respectively. But there is also an entry 343 for the virtual server 312 that represents the combination of all physical servers. And there is an entry for each place in the cluster that represents all the replicas of the place in the cluster. When the cluster has a virtual server 312, real-time updates to the Host catalog 120 (such as place creation, locking of a place, and place membership changes) are made in the place entries 334, 343 corresponding to the virtual server. The non-real time updates (such as place size, time last accessed, and time last modified) are made to the place entries 344, 345 corresponding to the physical servers 314, 316 in the cluster. This information allows the administrator to know the differences in access 399 and size 349 for the places 320, 322 in each of the physical servers 314, 316 in the cluster 318.

A QPTool placecatalog command with the -update flag set synchronizes the place entries 344, 345 that correspond to the physical servers 314, 316, and the place entries 343 that correspond to the virtual server 312.

To set up a virtual server 312 for a QuickPlace cluster 318, a network dispatcher is configured, such as IBM Network Dispatcher Version 3.6, with proper settings configured in the QPCONFIG.XML file (Table 1) on each server 312, 314, 316 in the cluster 318.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for aggregating data descriptive of a plurality of projects and servers, comprising:
   - configuring a catalog database server to a host catalog database and as accessible to a plurality of project servers;
   - configuring each said server for accessing said catalog database server;
   - providing for each said project server and each said project a separate entry in said host catalog database including catalog database indicia describing each said project server and project indicia describing each said project; said project server indicia including project server is master indicia and project server is virtual indicia;
   - executing simple aggregation by operating a project server which is a master server to access said catalog database server selectively for immediate update and scheduled update of said host catalog database; and
   - executing complex aggregation by operating a project server in a cluster of servers to access said catalog server selectively to send immediate updates to a master entry in said host catalog database for a master server in said cluster and non-immediate updates to an entry in said host catalog database for said project server.

2. The method of claim 1, at least one said project being implemented as a cluster including a master server and a plurality of project servers and project databases.

3. The method of claim 2, further comprising:
for scheduled update complex aggregation, selectively merging entries in said host catalog database from virtual master entries for a cluster to entries for project servers in said cluster and from project servers in said cluster to virtual master entries for said cluster.

4. The method of claim 1, further comprising implementing each said catalog entry as a database record.

5. The method of claim 1, further comprising implementing said host catalog database as a plurality of catalog databases servicing separate areas of an enterprise.

6. The method of claim 1, further comprising configuring said host catalog database to include a project server view for each project server in an enterprise and including project server name, project server is master, project server is virtual, project server access protocol, project server access port, project server access URL prefix, and project server cluster name indicia.

7. The method of claim 6, further comprising configuring said host catalog database to include a project by member view for each project in said enterprise and including project name, project title, project server name, project server is master, project server is virtual, project managers, project authors, project readers, project size, place last accessed, project last modified, and project is locked indicia.

8. The method of claim 1, further comprising executing as immediate updates changes including project create, project remove, project lock, change access, and change title.

9. The method of claim 8, further comprising executing as scheduled updates changes including last modified, size, and last accessed.

10. A system for aggregating data descriptive of a plurality of projects and servers, comprising:
a host catalog database;
a host catalog server;
a plurality of project servers;
a plurality of project databases;
a project cluster comprising a master server and a plurality of said project servers;
a project database associated with each said project server;
an entry in said host catalog database for each said project server and each said project database;
said host catalog server for executing simple aggregation on behalf of a project server which is a master non-virtual server selectively by immediate updating and scheduled updating of an entry in said host catalog database for said project server; and
said host catalog server for executing complex aggregation on behalf of said cluster of servers by executing immediate updates to a master entry in said host catalog database and by executing non-immediate updates to an entry in said host catalog database for a non-virtual, non-master project server.

11. The system of claim 10, further comprising:
said host catalog server, for scheduled update complex aggregation, for merging entries in said host catalog database selectively from virtual master entries for a cluster to entries for project servers in said cluster and from entries for project servers in said cluster to virtual master entries for said cluster.

12. The system of claim 10, each said catalog entry comprising a database record.

13. The system of claim 10, said host catalog database being a plurality of catalog databases servicing separate areas of an enterprise.

14. A program storage device readable by a machine, tangibly embodying a program of instructions executable by a machine to perform method steps for aggregating data descriptive of a plurality of projects and servers, said method comprising:
configuring a catalog database server to a host catalog database and as accessible to a plurality of project servers;
configuring each said server for accessing said catalog database server;
providing for each said project server and each said project a separate entry in said host catalog database including catalog database indicia describing each said project server and project indicia describing each said project; said project server indicia including project server is master indicia and project server is virtual indicia;
executing simple aggregation by operating a project server which is a master server to access said catalog database server selectively for immediate update and scheduled update of said host catalog database; and
executing complex aggregation by operating a project server in a cluster of servers to access said catalog server selectively to send immediate updates to a master entry in said host catalog database for a master server in said cluster and non-immediate updates to an entry in said host catalog database for said project server.

15. A computer program product for aggregating data descriptive of a plurality of projects and servers, comprising:
a computer readable storage medium;
first program instructions for configuring a catalog database server to a host catalog database and as accessible to a plurality of project servers;
second program instructions for configuring each said server for accessing said catalog database server;
third program instructions for providing for each said project server and each said project a separate entry in said host catalog database including catalog database indicia describing each said project server and project indicia describing each said project; said project server indicia including project server is master indicia and project server is virtual indicia;
fourth program instructions for executing simple aggregation by operating a project server which is a master server to access said catalog database server selectively for immediate update and scheduled update of said host catalog database;
fifth program instructions for executing complex aggregation by operating a project server in a cluster of servers to access said catalog server selectively to send immediate updates to a master entry in said host catalog database for a master server in said cluster and non-immediate updates to an entry in said host catalog database for said project server; and
wherein said first, second, third, fourth, and fifth program instructions are recorded on said computer readable storage medium.

* * * * *